July 1, 1958 J. G. ARCENEAUX 2,841,103
SUGAR CANE PLANTER
Filed June 17, 1954 3 Sheets-Sheet 2
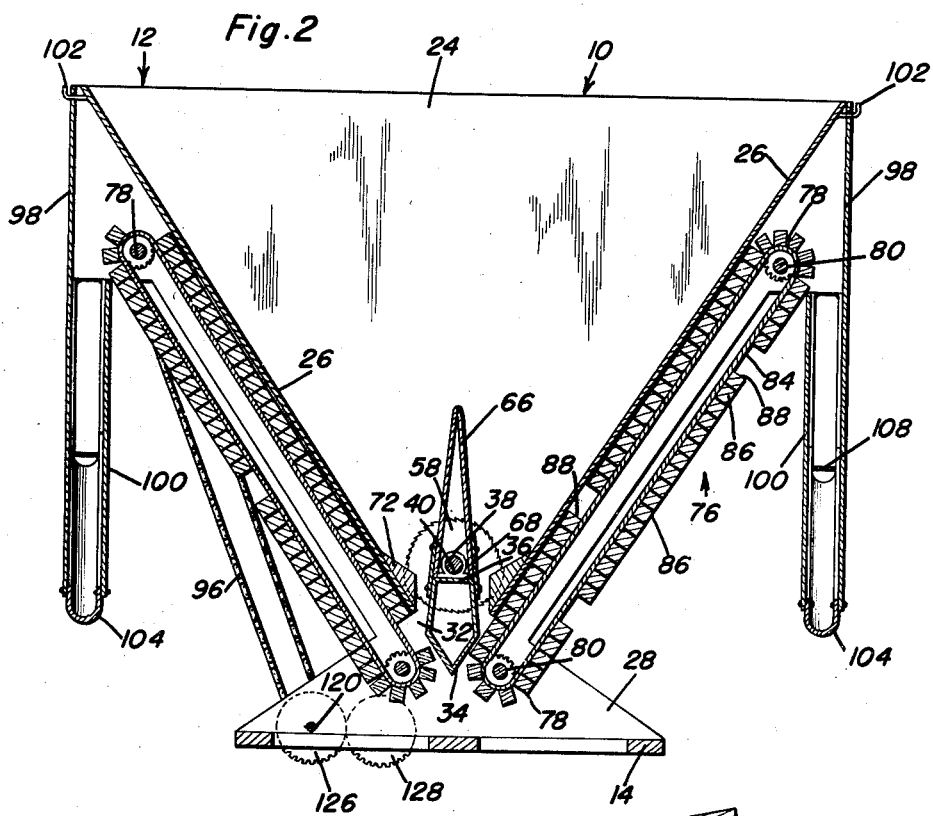
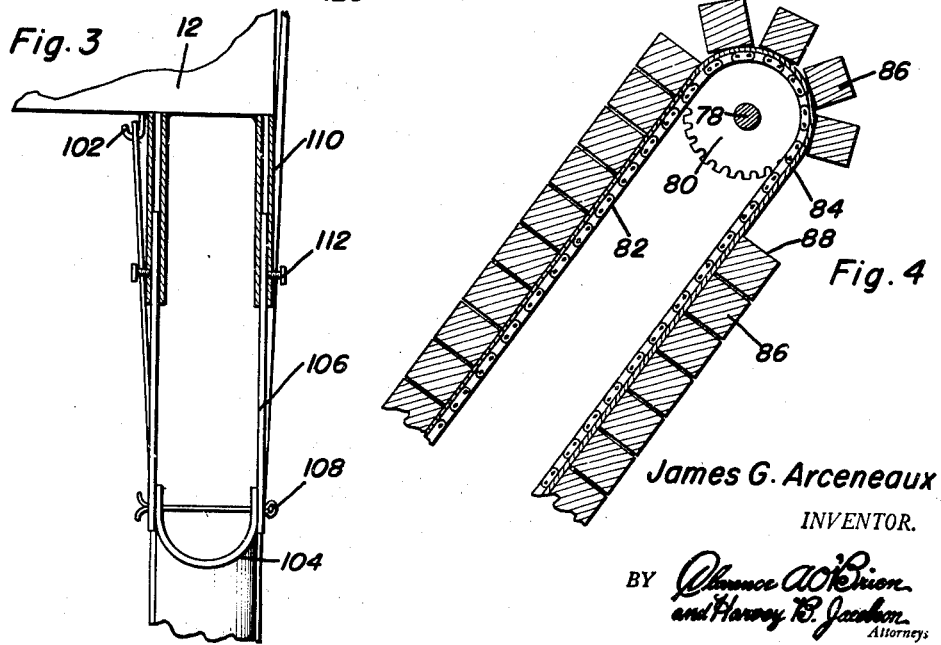
James G. Arceneaux
INVENTOR.

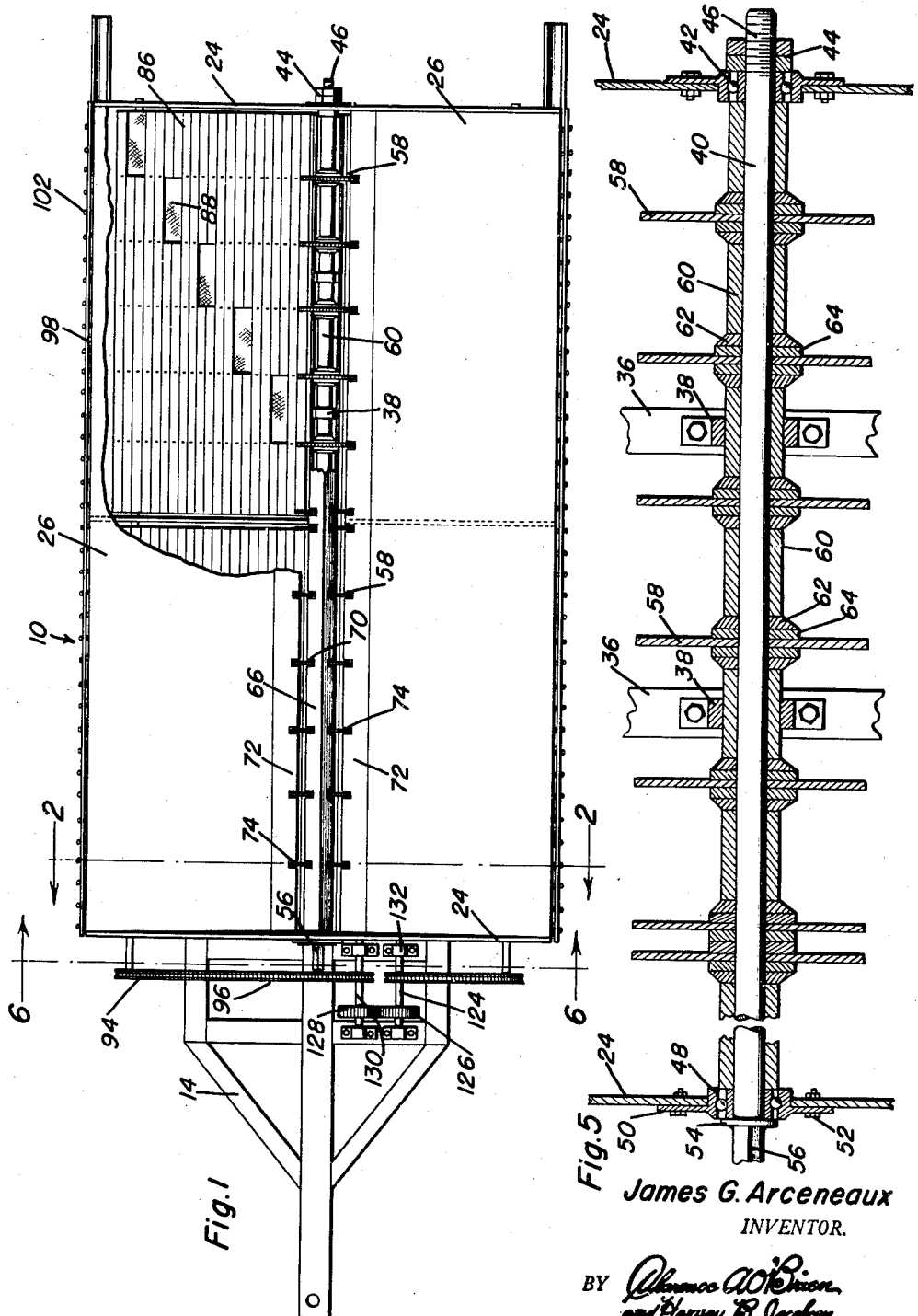

July 1, 1958  J. G. ARCENEAUX  2,841,103
SUGAR CANE PLANTER

Filed June 17, 1954  3 Sheets-Sheet 3

James G. Arceneaux
INVENTOR.

United States Patent Office 2,841,103
Patented July 1, 1958

2,841,103

SUGAR CANE PLANTER

James G. Arceneaux, Chamberlin, La.

Application June 17, 1954, Serial No. 437,396

2 Claims. (Cl. 111—5)

This invention relates to a sugar cane planter and more specifically provides a device for cutting a cane stalk into seed pieces and placing the seed pieces into an open row, thereby planting sugar cane.

The present method of planting sugar cane is carried out by hand, wherein the seed cane stalks are cut into sections of a desired length and placed into open rows and then covered with soil. Previously, the cutting operation was carried out and the sections placed into a pile, wherein the pile of cut sections was then transported to the field for planting by hand. Machines now have been perfected that will carry out the cutting operation and then load the sugar cane on a suitable transporting vehicle for transportation to the field. However, none of the present machines actually cuts the sugar cane and places the cut off sections in the rows. Therefore, it is the primary object of the present invention to provide a machine that will cut the sugar cane stalks into desired lengths and deposit the sections into the open rows, thereby facilitating the sugar cane planting operation and saving a great deal of labor necessary in the planting operation.

Another object of this invention is to provide a sugar cane planter comprising a single machine for sequentially cutting the sugar cane stalks into desired lengths, conveying the desired lengths into planting troughs and discharging the desired lengths into the open rows as the machine progresses across the field.

A still further object of this invention is to provide a sugar cane planter which is relatively simple in construction, efficient in operation, rugged, easy-to-use, well adapted for its intended purposes, and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the sugar cane planter of the present invention with portions thereof being broken away showing the arrangement of the conveying mechanism for picking up the cut off portions of the sugar cane stalk;

Figure 2 is a transverse, vertical sectional view on a larger scale taken substantially along section line 2—2 of Figure 1, showing the details of construction of the saws, conveying means and discharge spout;

Figure 3 is a detailed sectional view showing the adjustable means for supporting the trough member wherein the rate of discharge of the trough may be adjusted;

Figure 4 is a detailed sectional view showing the construction of the conveying means and the drive mechanism therefor;

Figure 5 is a longitudinal, vertical sectional view taken substantially along the longitudinal axis of the saw mechanism showing the details of construction of the saws and the mounting means therefor;

Figure 6:
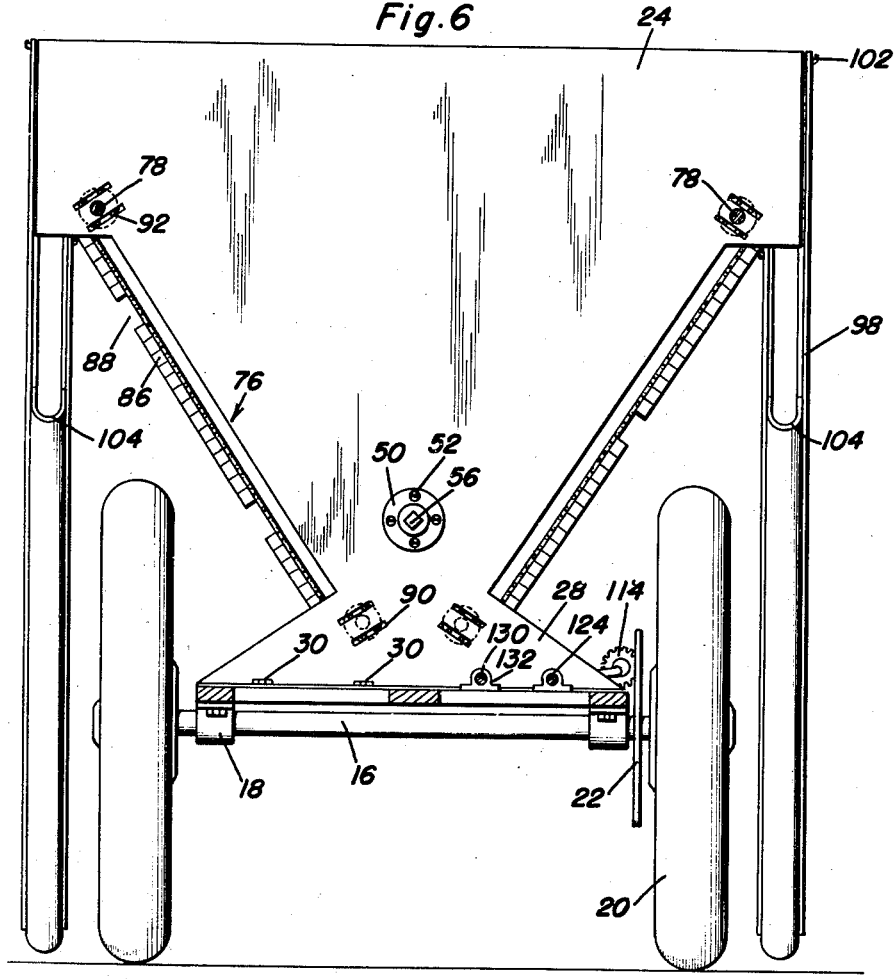
Figure 6 is a transverse, vertical sectional view on a larger scale, taken substantially along section line 6—6 of Figure 1, showing an end view of the body portion of the sugar cane planter.

Referring now specifically to the drawings, it will be seen that the numeral 10 generally designates the sugar cane planter of the present invention, and the planter 10 includes a frame 14 having longitudinal and transverse members with a centrally positioned axle 16 extending transversely thereof and secured thereto by bearing members 18. The axle 16 is provided with ground engaging supporting wheels 20 at each end thereof, and a plate type gear 22 is secured to the axle 16 adjacent one end thereof and the gear 22 is provided with teeth on its inner side for a purpose described hereinafter. A body generally designated by the numeral 12 is secured to the frame 14 by suitable fastening means, and the body 12 includes end walls 24 and inwardly converging side walls 26, thereby forming substantially a triangular body 12. The lower portion of the end members 24 are provided with a triangular projection 28 for attachment to the frame 14 by fastening means 30. The adjacent lower end portions of the inwardly converging side walls 26 are spaced from each other for receiving a polygonal tubular member 32 that extends the length of the body 12 and is secured to the end members 24. The lower end of the polygonal member 32 is pointed, as indicated by the numeral 34, and the upper part is provided with a plurality of transverse members 36 for supporting bearing blocks 38 that rotatably journal an elongated rotating shaft 40 therein. The shaft 40 extends through the end members 24, wherein bearings 42 are provided on the rear end wall 24 and a pair of nuts 44 are screw threaded on a threaded end portion 46 of the shaft 40 for retaining the shaft 40 journaled in the rear end member 24 of the body 12. The forward end of the shaft 40 is provided with a bearing 48 having a peripheral plate 50 secured thereto that is attached to the forward end member 24 by suitable fastening means 52. The shaft 40 is provided with a peripheral flange 54 for engaging the bearing 48, thereby forming a thrust member for coaction with the threaded nut 44 wherein the shaft 40 may be rotatably journaled in the end member 24. The forward end of the shaft 40 exteriorly of the forward end member 24 is polygonal, as indicated by the numeral 56, for receiving a drive shaft from a power take-off of a tractor or other towing vehicle (not shown). A plurality of circular saws 58 are positioned in longitudinally spaced relation on the shaft 40, and the saws 58 are retained in spaced relation by cylindrical spacers 60, spacing washers 62 and washers 64 that are constructed of a fibrous or vibration absorbing material. An inverted V-shaped member 66 is positioned over the lower tubular portion 34 forming a closure therefor and secured thereto by strap brackets 68. The diverging legs of the inverted V-shaped member 66 straddle the bearing blocks 38 and are provided with slots 70 for receiving the saws 58, thereby permitting the saws to turn with the inverted V-shaped member 66 positioned thereover, wherein the inverted V-shaped member 66 forms a separator or guide for directing the horizontally disposed sugar cane stalks onto the saws 58 for cutting the stalks into sections of desired lengths. It also will be seen that triangular blocks 72 are provided along the length of the lower ends of the converging side walls 26, and these blocks 72 are formed with slots 74 for closely receiving the saws 58 wherein the sugar cane is guided into engagement with the saws and the triangular blocks and the side walls of the inverted V-shaped member 66 and the lower hollow member 34 act as guide for guiding the discharge of the stalk sections after they have been cut by the saws 58.

Referring now specifically to Figures 2 and 4, it will be seen that a pair of conveyors generally indicated by the numeral 76 is positioned under each of the side walls 26 and each of the conveyors 76 includes a pair of spaced shafts 78 having gears 80 on each end thereof for receiving an endless sprocket chain 82. The gear 80 and sprocket chain 82 are constructed complementary to each other for movement of the endless chain 82 over the sprocket gear 80. A flexible canvas backing member 84 is secured between the two endless chains of each conveyor 76 wherein the endless chains 82 form the ends of the conveyors 76 and engage the sprocket gears 80. A plurality of wooden slats 86 are secured to the canvas backing 84 and, as specifically illustrated in Figure 1, alternate pairs of the slats 86 are provided with vacant areas 88, thereby forming a series of vacant areas or pockets 88 for a purpose described hereinafter. It will be seen that the shafts 78 are positioned with the lower shafts adjacent each other and below and inwardly of the discharge slot formed by the guide blocks 72 and the inverted V-shaped member 66 together with the tubular member 32 and the upper shafts are positioned in a similarly spaced relation from the undersurface of the inclined side walls 26 wherein the conveyors 76 have an inclined carrying surface. The wooden slats 86 follow the contour of the gears 80 and closely pass by the pointed end 34 of the lower tubular member 32, wherein sections of sugar cane stalk which have been cut by the saws 58 and deposited downwardly through the area between the triangular block 72 and the central tubular member 32 will be deposited in the alternate vacant areas or pockets 88 formed by the missing portions of the slats 86. The forward end of each of the shafts 78 is journaled in the end walls 24 by suitable bearings and are adjustable therein by slots 90 and fastening means 92. The forward ends of the upper shaft 78 project beyond the front end wall 24 and are provided with sprocket gears 94 for receiving an endless sprocket chain 96 for driving the conveyors 76 as described hereinafter.

The conveyors 76 discharge between two vertically disposed canvas members 98 and 100 with the outer canvas member 98 secured to hooks 102 adjacent the upper edge of the inclined wall 26 and the inner canvas member 100 is secured to similar hooks on projecting portions of the body 10. The lower ends of the canvas members 98 and 100 are riveted or otherwise secured to an elongated U-shaped trough 104 that is downwardly inclined and projects rearwardly from the rear portion of the body 10. The U-shaped trough 104 is attached at its forward end to a pair of rods 106 with a transverse key 108 wherein the rods 106 are slidably received in tubular members 110 that are secured to the projecting portion of the body 10, and the rods 106 are secured in adjusted position by setscrews 112 whereby the inclination of the trough 104 may be adjusted for varying the rate of discharge of the sections of sugar cane stalks therefrom.

Figure 7:
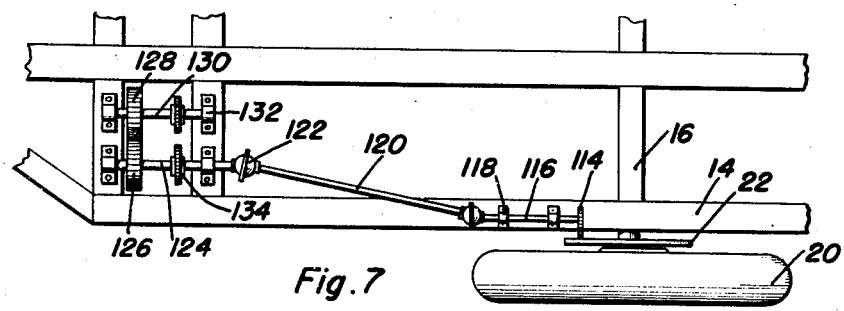
Figure 7 is a detailed top plan view showing the drive means for the conveying mechanism.

Referring now specifically to Figure 7, it will be seen that a spur gear 114 is mounted on the end of a shaft 116 that is journaled in bearings 118 on the frame 14 for engaging the gear 22 wherein the rotational motion of the axle 16 and the ground engaging wheel 20 is transferred to the shaft 116. The shaft 116 transmits the motion through a connecting shaft 120 and a pair of universal joint couplings 122 to a drive shaft 124 that is provided with a spur gear 126 in meshing engagement with a spur gear 128 on a second drive shaft 130. The drive shafts 124 and 130 are journaled in suitable bearings 132 mounted on the frame 14. The meshing gears 126 and 128 assure that the driving shafts 124 and 130 will be rotating at the same speed. Each of the shafts 124 and 130 is provided with a sprocket gear 134 that receives the endless driving chain 96 that engages the sprocket gear 94 on the forward ends of the shafts 78, thereby driving the conveyors 76 whereby the forward speed of the machine 10 will determine the number of sections of sugar cane stalks that are discharged from the trough inasmuch as the rate of speed of the machine will determine the speed of the conveyors 76.

In operation, the stalks of sugar cane are positioned in the body 12 wherein the inclined side walls 26 guide the stalks of sugar cane substantially into a horizontal position for engaging the plurality of saws 58 wherein the stalks of sugar cane are cut into sections of desired length. The sections of desired length of sugar cane stalks then pass downwardly between the triangular blocks 72 positioned on the lower end of the inclined walls 26 and the divider formed by the inverted V-shaped member 66 and the lower hollow portion 32 thereof. These sections of sugar cane stalk are then picked up by the pockets 88 formed by the vacant areas or omitted portions of the slats 86 whereby the sections of sugar cane are transported upwardly and discharged between the canvas members 98 and 100 downwardly onto the rearwardly and downwardly inclined trough 104 wherein they are discharged to the rear of the machine 10. Obviously, the stalks or sections of stalks are discharged into open rows, wherein the major portion of the planting operation has been carried out. If deemed desirable, suitable means may be positioned rearwardly of the machine 10 for covering the rows of the sugar cane, thereby completely carrying out the planting operation.

The device may be constructed of any suitable materials, and the particular size and arrangement of parts may be varied as desired. The particular spacing between adjacent saws 58 may be changed to any desired length by changing the lengths of the spacers 60, and it will be seen that all of the elements are easily removed for repair or replacement, thereby forming an economically and easily maintained device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A sugar cane planter comprising a mobile receptacle having elongated inclined converging side walls for receiving elongated sugar cane stalks, a longitudinally extending upstanding divider between the side walls for dividing the receptacle into two compartments, said divider having downwardly diverging walls with a plurality of vertically disposed and longitudinally spaced slots in each wall of the divider, the slots in one wall being disposed in alignment with the slots in the other wall, a longitudinal shaft disposed between the inclined walls of the divider, a plurality of longitudinally spaced circular saws mounted on said shaft, the periphery of said saws projecting through aligned pairs of slots and terminating adjacent the converging walls of the receptacle whereby the walls of the receptacle and the divider guide the sugar cane stalks into the saws, the walls of the receptacle terminating in spaced bottom edges, conveying means extending inwardly under the bottom edges of the walls of the receptacle for receiving the cut lengths of sugar cane stalk from between the saws, and discharge means receiving the cut lengths of stalk from the conveying means and depositing the same in longitudinal rows on the ground.

2. The combination of claim 1 wherein said conveying means includes a pair of conveyors extending laterally under the inclined walls of the receptacle, each conveyor including a pair of spaced parallel rollers, an endless flexible sheet of backing material encircling said rollers, a plurality of slats mounted on said sheet, certain of said slats having vacant portions of a length for receiving the cut lengths of sugar cane stalks from between the saws and discharging the same into the discharge means.

References Cited in the file of this patent

UNITED STATES PATENTS

| | | |
|---|---|---|
| 385,234 | Bon | June 26, 1888 |
| 513,807 | Olivera et al. | Jan. 30, 1894 |
| 1,678,643 | Kassebeer | July 31, 1928 |
| 1,785,743 | Morgan | Dec. 23, 1930 |
| 1,908,548 | Smith | May 8, 1933 |

FOREIGN PATENTS

| | | |
|---|---|---|
| 100,757 | Australia | Apr. 8, 1937 |